F. W. WILLIS.
LEVEL ROD.
APPLICATION FILED JULY 5, 1911.
1,014,547.
Patented Jan. 9, 1912.
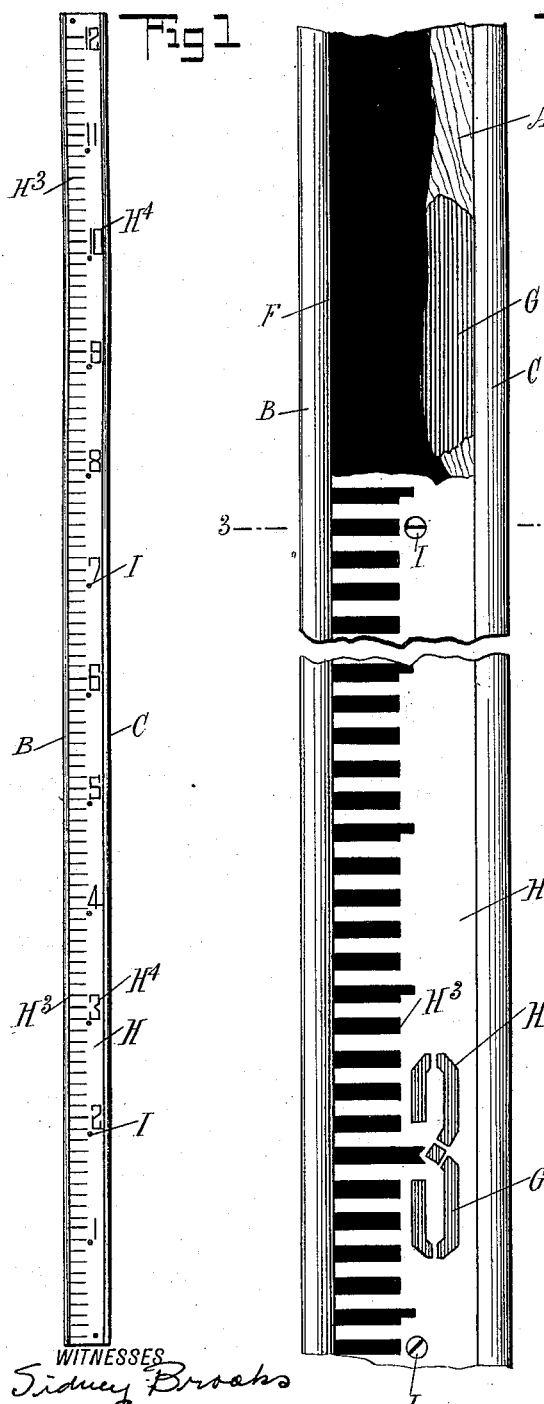
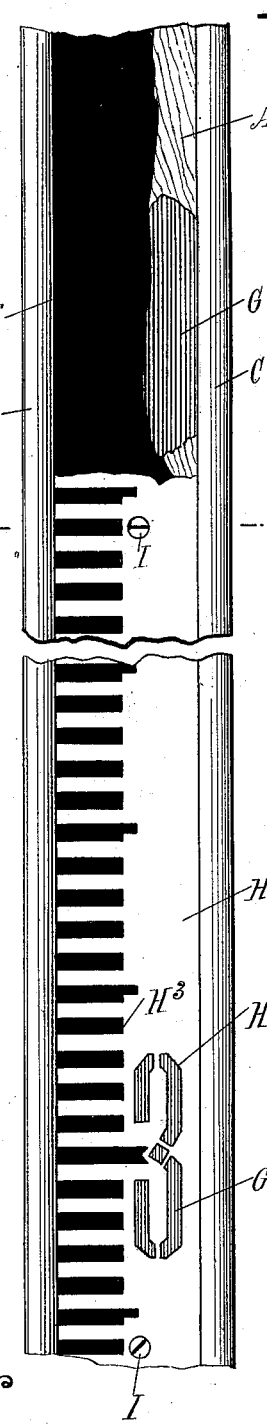
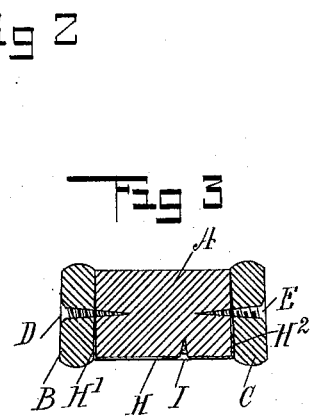
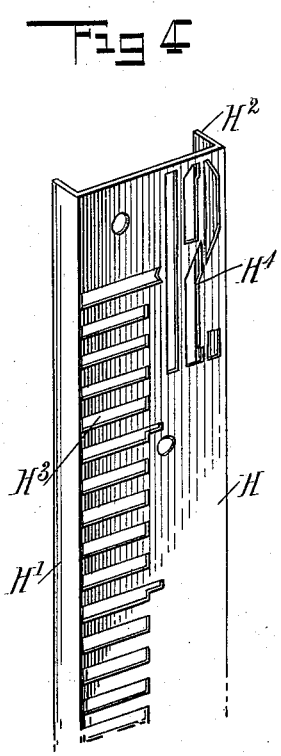
INVENTOR
Franklin W. Willis
BY
ATTORNEYS
WITNESSES

UNITED STATES PATENT OFFICE.

FRANKLIN WHITFIELD WILLIS, OF ROANOKE, VIRGINIA.

LEVEL-ROD.

1,014,547. Specification of Letters Patent. Patented Jan. 9, 1912.

Application filed July 5, 1911. Serial No. 636,849.

*To all whom it may concern:*

Be it known that I, FRANKLIN W. WILLIS, a citizen of the United States, and a resident of Roanoke, in the county of Roanoke and State of Virginia, have invented a new and Improved Level-Rod, of which the following is a full, clear, and exact description.

The invention relates to surveying instruments, and its object is to provide a new and improved level rod, arranged to permit convenient and quick repainting of the scale parts in case the same become dim or soiled, and without requiring skilled labor.

For the purpose mentioned, use is made of a stock provided with differently-colored bands, and a scale plate overlying the rod and having sets of scale openings, of which one set represents fractions of a unit and overlies one colored band, and the other set of openings indicates unit numerals appearing over the other colored bands.

A practical embodiment of the invention is represented in the accompanying drawings forming a part of this specification, in which similar characters of reference indicate corresponding parts in all the views.

Figure 1 is a side elevation of the level rod; Fig. 2 is an enlarged side elevation of a portion of the same, parts being broken out; Fig. 3 is a cross section of the same on the line 3—3 of Fig. 2; and Fig. 4 is a perspective view of the upper portion of the scale plate.

The stock A of the level rod may be of wood or other suitable material, and preferably made rectangular in cross section, as plainly indicated in Fig. 3, and on the sides of the stock A are secured the side pieces B and C by the use of screws D and E or other suitable fastening means. On the face of the stock A is painted a colored band F, preferably black, and extending from one end of the stock A to the other and occupying approximately one-half of the said face, while on the other half of the face are arranged sets of colored bands G, colored in contradistinction to the band F, which latter is preferably black, while the sets of bands G are preferably red. The sets of colored bands G are spaced apart one foot, and the said stock face A is overlaid with a scale plate H fastened in place on the stock by screws I or other fastening means. The scale plate H is provided at the sides with flanges H', H² fitting the sides of the stock A, and being clamped in place by the side pieces B and C, and on one side of the scale plate A is arranged a set of openings H³ indicating fractions of a unit, such as inches and sub-divisions, and overlying the colored band F, so that the color appears through the openings H³. The scale plate H is also provided with sets of openings H⁴ representing unit-indicating numerals spaced one foot apart and overlying the colored bands G, so that the color of the latter appears through the openings H⁴ in contrast to the color appearing through the openings H³. It will be noticed that in case the colored band F or the colored bands G become dim or soiled, then the user of the level rod can readily renew the same by repainting with the corresponding color, after first removing the sides B and C and the scale plate H. It is understood that the bands F and G can be irregularly colored, that is, it does not require skilled labor to paint the stock A for producing the colored bands F and G, as the latter may be irregular as long as they are of sufficient width, and, in the case of the bands G, of sufficient length, to appear through the openings H³ and H⁴. After the stock A has been repainted, the scale plate H is replaced and fastened in place by the screws I, and then the side pieces B and C are placed in position on the stock and fastened thereto by the screws D and E.

Having thus described my invention, I claim as new and desire to secure by Letters Patent:

1. An engineer's level rod, comprising a stock provided on its face with differently colored bands, and a scale plate overlying the said stock face and provided with sets of openings, one of the sets of openings representing fractions of a unit and extending over one colored band, and the other set of openings representing unit-indicating numerals and overlying the other colored bands.

2. An engineer's level rod, comprising a stock provided on its face with differently-colored bands, and a scale plate overlying the said stock face and provided with sets of openings, one of the sets of openings representing fractions of a unit and extending over one colored band, and the other set of openings representing unit-indicating numerals and overlying the other colored bands, the scale plate having side flanges fitting the sides of the stock, and side pieces secured to the sides of the stock and clamping the said flanges in place against the side of the stock.

3. An engineer's level rod, comprising a stock provided on its face with a single colored band extending throughout the length of the stock and overlying approximately one-half of the width of the face, the latter being provided on the remaining portion with a series of spaced bands colored differently from the said single band, and a scale plate overlying the said stock face and provided with sets of openings, of which one set of openings represents fractions of a unit and overlies the said single colored band, and the other sets of openings represents unit-indicating numerals spaced apart and overlying the said series of colored bands.

In testimony whereof I have signed my name to this specification in the presence of two subscribing witnesses.

FRANKLIN WHITFIELD WILLIS.

Witnesses:
LAWRENCE S. DAVIS,
J. E. CRAIG.

---

Copies of this patent may be obtained for five cents each, by addressing the "Commissioner of Patents, Washington, D. C."